United States Patent [19]

Krueger et al.

[11] Patent Number: 4,518,762

[45] Date of Patent: May 21, 1985

[54] PROCESS FOR MAKING EPOXY NOVOLAC RESINS WITH HIGH EPOXY VALUES

[75] Inventors: Ulf A. Krueger, Coventry; Thomas M. Meshako, West Warwick, both of R.I.

[73] Assignee: Ciba Geigy Corporation, Ardsley, N.Y.

[21] Appl. No.: 530,177

[22] Filed: Sep. 8, 1983

[51] Int. Cl.³ .................. C08G 59/40; C08G 59/00
[52] U.S. Cl. ................................. 528/95; 528/106; 528/86; 528/87; 528/110; 523/400; 523/401; 523/402; 549/517
[58] Field of Search ............ 528/106, 86, 87, 110, 528/95; 523/400, 401, 402; 549/517

[56] References Cited

U.S. PATENT DOCUMENTS

| | | | |
|---|---|---|---|
| 2,840,541 | 6/1958 | Pezzaglia | 528/106 |
| 2,848,435 | 8/1958 | Griffin et al. | 528/95 |
| 2,943,096 | 6/1960 | Reinking | 549/517 |
| 2,995,583 | 8/1961 | Larkin et al. | 260/348.6 |
| 3,336,342 | 8/1967 | Frank et al. | 549/517 |
| 3,372,142 | 5/1968 | Smith | 528/93 |
| 3,766,221 | 10/1973 | Becker | 260/348.6 |
| 3,980,679 | 9/1976 | Becker | 260/348.6 |

FOREIGN PATENT DOCUMENTS

69/08790 12/1970 Netherlands.
70/08287 12/1971 Netherlands.

*Primary Examiner*—John Kight
*Assistant Examiner*—Marvin L. Moore
*Attorney, Agent, or Firm*—Luther A. R. Hall

[57] ABSTRACT

An improved process for making glycidyl ethers of novolac resins, particularly cresol and phenol novolacs, by reaction of the novolac with a solid alkali metal hydroxide in excess epichlorohydrin and in the presence of an alcohol cosolvent where the reaction mixture contains a small amount of water, wherein the improvement comprises carrying out the etherification and dehydrochlorination in a combined one step process, in the absence of a catalyst specific for chlorohydrin formation, and using the solid alkali metal hydroxide in the form of tiny beads.

9 Claims, No Drawings

PROCESS FOR MAKING EPOXY NOVOLAC RESINS WITH HIGH EPOXY VALUES

FIELD OF THE PRESENT INVENTION

The present invention pertains to an improved process for producing glycidyl ethers of novolac resins, particularly cresol and phenol novolacs, to obtain such epoxy cresol novolac (ECN) or epoxy phenol novolac (EPN) resins with high epoxy values in a facile one step process.

BACKGROUND OF THE INVENTION

The epoxy cresol novolac (ECN) resins have become important items of commerce with a myriad of uses based on their highly desirable physical properties after curing. These ECN resins, with a multiplicity of glycidyl ether groups in each molecule, lead to cured resins with high crosslink density and great rigidity. Such properties are particularly important in the electronics industry for circuit boards and encapsulation of electronic devices.

Aqueous sodium hydroxide solutions (50%) are used in the addition and dehydrochlorination steps in conventional ECN and EPN preparation processes. The water introduced by the solution contributes to the resulting products having low epoxy values. Conventional ECN resins have epoxy values in the range of 0.44–0.46 equivalents/100 gram resin, and conventional EPN resins have epoxy values in the range of 0.55–0.57 equivalents/100 grams resin. While such values characterize resins with excellent properties as mentioned above, resins with still higher epoxy values would open new markets for applications demanding even higher levels of performance. As smaller and more complex electronic devices are developed, the requirements for the performance of the resins used to protect them will continue to become more and more stringent.

Novolacs are prepared by the acid catalyzed reaction of a phenol, such as phenol, o-cresol, m-cresol, p-cresol or the like, with formaldehyde. Epoxy novolacs are formed by reaction of the novolac with epichlorohydrin first to form the corresponding chlorohydrin ether intermediate followed by dehydrochlorination to the epoxy novolac itself.

The patent literature describes a number of processes for the manufacture of glycidyl ethers which use catalysts for the chlorohydrin ether formation. The processes are, in some cases, very involved and their products do not have the desired low chlorine content. In addition the presence of residual catalyst or catalyst by-product in the resin may adversely affect product performance.

According to the process described in U.S. Pat. No. 3,336,342, polyhydric phenols are reacted with epihalogenohydrins in the presence of sulphonium salts, or compounds containing sulphur which can react with epihalogenohydrin to give sulphonium salts, to form the corresponding halogenohydrins from which, after removing the excess epihalogenohydrin, hydrogen halide is split off so as to arrive at the desired epoxide compounds. This process is very time consuming since the formation of the chlorohydrin ether requires at least 40 hours. Furthermore, the recovered excess epihalogenohydrin distilled off contains some dihalogenohydrin which must be worked up separately before being reused. For these reasons the process is very time-consuming, involved and uneconomical.

According to the process described in U.S. Pat. No. 3,372,142, not only carboxylic acids but also phenols are converted into the chlorohydrin compounds by means of excess epichlorohydrin in the presence of benzyltrimethylammonium chloride or anionic exchange resins and thereafter converted into the epoxide compounds with an aqueous solution of an alkali metal hydroxide which is saturated with an alkali metal carbonate. Here again it is found that the process is much too time-consuming for practical use since the formation of the chlorohydrin ether requires 25 hours, excluding the work-up of the chlorohydrin ether to give the epoxide compound which would require a further 10–15 hours; the kettle occupancy time would be unacceptable in practice.

A similar process is described in U.S. Pat. No. 2,943,096, according to which, again, polyhydric phenols and epichlorohydrin are converted into the chlorohydrin ether, in the presence of tetramethylammonium chloride or benzyltrimethylammonium chloride. This again requires 25 hours. The subsequent work-up of the batch proves to be very expensive since the excess epichlorohydrin, after being recovered by distillation, must be treated with sodium hydroxide solution to reduce its dichlorohydrin content before reuse. The isolated chlorohydrin ether is dissolved in a solvent mixture of toluene/ethanol and converted into the glycidyl ether by reaction with 18 weight % aqueous sodium hydroxide solution. Here again the individual process steps require a great deal of time so that this process cannot be regarded as very economical.

According to the data in Netherlands Published Specification No. 69/08790 excess epichlorohydrin is reacted, in a first stage, with a polyphenol in the presence of a catalyst, for example a quaternary ammonium salt to give the chlorohydrin ether, the conversion being at least 80% and preferably at least 90%, relative to the phenolic hydroxyl groups. In the second stage, an aqueous sodium hydroxide solution which contains 0.80 to 0.99 equivalent of sodium hydroxide per phenolic hydroxyl group is added, water being distilled off azeotropically. The glycidyl ether is additionally subjected to a postdehalogenation.

According to the disclosures in Netherlands Published Specification No. 70/08287 excess epichlorohydrin is reacted, in a first stage, with a polyphenol in the presence of a catalyst, for example a quaternary ammonium salt, to the chlorohydrin ether, the conversion being at least 5%, but less than 80%, relative to the phenolic hydroxyl value. In the second stage, an aqueous sodium hydroxide solution which contains 0.80 to 0.99, preferably 0.92 to 0.98, equivalent of sodium hydroxide per phenolic hydroxyl group is added, water being distilled off azeotropically whilst recycling the dehydrated epichlorohydrin. The glycidyl ether is additionally subjected to a post-dehalogenation. The quoted contents of easily saponifiable chlorine in the resulting products of the process are between 0.075 and 0.20% by weight.

U.S. Pat. No. 2,848,435 describes a process for making glycidyl ethers of polyhydric phenols (bisphenol A) which uses isopropanol as a cosolvent along with liquid caustic or solid caustic pellets. Solid caustic was used without substantial water addition. Even when a 9:1 molar ratio of epichlorohydrin to bisphenol A was used, the resulting liquid resin had a low epoxy value.

U.S. Pat. No. 2,995,583 describes a process for making glycidyl ethers of polyhydric phenols including novolac resins which uses a concentrated aqueous solution of an alkali metal hydroxide as the alkali source.

U.S. Pat. Nos. 3,766,221 and 3,980,679 describe processes for preparing glycidyl ethers wherein the etherification step is first carried out in the presence of a catalyst specific for the formation of the chlorohydrin intermediate, such as choline, a choline salt or a quaternary ammonium salt in the absence of alkali, followed by the addition of solid alkali metal hydroxide to effect the dehydrochlorination reaction to the desired epoxy compound.

The instant process is an improvement over the processes of U.S. Pat. Nos. 3,766,221 and 3,980,679 in that no catalyst specific for the formation of the chlorohydrin intermediate is needed, the etherification and dehydrochlorination are carried out in a one step process in the presence of an alcohol as cosolvent, and where the solid alkali metal hydroxide is used in the form of tiny beads.

OBJECT OF THE INVENTION

The object of the instant invention is a method or process to prepare epoxy novolac resins, particularly epoxy cresol novolac (ECN) or epoxy phenol novolac (EPN) resins, with higher than normal epoxy values, in the range of 0.48–0.52 equivalents/100 grams resin for ECN resins and in the range of 0.60–0.64 equivalents/100 grams resin for EPN resins.

DETAILED DISCLOSURE

The instant invention pertains to an improved process for the production of an epoxy novolac resin, having a higher than normal epoxy value, wherein a novolac is reacted with excess epichlorohydrin, based on the phenolic hydroxyl value, in the presence of 0.5 to 8% by weight of water, based on the reaction mixture, and with 0.9 to 1.15 equivalents of solid alkali metal hydroxide per phenolic hydroxyl group, to give the epoxy novolac, wherein the improvement comprises
carrying out the reaction at a temperature of 40°–100° C., in the absence of any catalyst specific for the formation of the chlorohydrin ether intermediate, in the presence of 2 to 25% by weight, based on the reaction mixture, of a lower alkanol or lower alkoxyalkanol cosolvent, using a solid alkali metal hydroxide in the form of beads of about 1 mm diameter, which hydroxide is charged to the reaction mixture portionwise or continuously during a gradually escalating addition program, and isolating the epoxy novolac resin.

The instant improved process contains three essential elements which are needed to achieve the object of preparing epoxy novolac resins with higher than normal epoxy values at relatively low epichlorohydrin to novolac ratios. These are:

(1) The use of small divided caustic beads which handle well and dissolve rapidly;

(2) the use of a gradually increasing rate of caustic addition which favors formation of chlorohydrin and minimizes dehydrohalogenation of the intermediate chlorohydrin ether to form epoxy groups which can react with novolac phenolic hydroxyl groups, thus forming higher molecular weight, lower epoxy value products; and (3) the use of a lower alcohol or alkoxyalcohol as cosolvent. This alcohol serves three important functions. In the early stages of the reaction it solubilizes the sodium salt of the novolac, thus accelerating formation of the chlorohydrin intermediate. As the water content of the reaction mixture builds up, the alcohol prevents formation of a separate water phase which would lead to excessive epichlorohydrin hydrolysis. Finally, it facilitates salt removal either by dissolution in water or by settling and decantation.

It is the correct combination of these three ideas which gives rise to a practical manufacturing process for epoxidized novolacs.

Using the novolac prepared from o-cresol as an illustrative example, the addition reaction of the instant process is outlined below where n is generally 0.7 to 10.

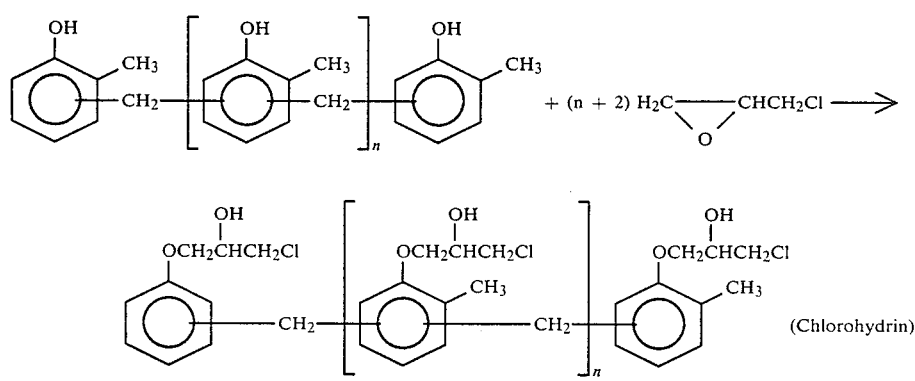

The presence of a small amount (0.5–2.0%) of water initially is known to facilitate and accelerate the formation of the chlorohydrin ether from the phenolic hydroxyl and epichlorohydrin.

It is certainly advantageous that the formation of the chlorohydrin ether proceed expeditiously to deplete the reaction mixture of free phenolic hydroxyl groups before glycidylation occurs in the presence of the alkali metal hydroxide and to prevent the formation of by-product phenoxy ethers which would lower the epoxy value of the epoxidized resin. This can be achieved by using a gradually escalating caustic addition program for the dehydrochlorination reaction. By the use of a gradually increasing rate of caustic addition throughout the reaction the formation of the intermediate chlorohydrin ether is favored and its dehydrochlorination to form epoxy groups, which can react with novolac phenolic hydroxyl groups to form higher molecular weight products with lower epoxy values, is minimized.

The gradually escalating addition program for adding caustic to the reaction mixture is aimed at adding more caustic in the later stages of the reaction than in the earlier stages. This can be achieved in a number of ways both in portionwise or continuous addition modes. Portions of gradually increasing size added at the same intervals or the same size portions added at gradually decreasing intervals or combinations thereof are contemplated. Likewise, a programmed continuous addition to achieve the same condition is also contemplated as embodiments of the instant invention.

The glycidylation or dehydrochlorination reaction outlined below with an o-cresol novolac resin occurs when the cresol novolac intermediate reacts with the alkali to yield the final resin, water and alkali metal chloride salt.

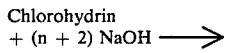
Chlorohydrin
+ (n + 2) NaOH ⟶

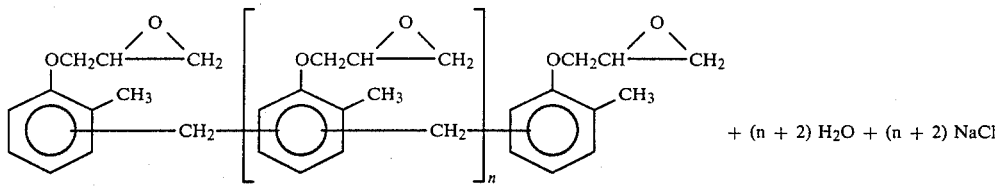
+ (n + 2) H₂O + (n + 2) NaCl

The glycidyl ethers produced by the instant process generally contain less than 0.1% by weight of easily hydrolyzable chlorine. However, if desired, the hydrolyzable chlorine content can be further reduced by a subsequent dehydrochlorination step. The improved glycidyl ethers produced can therefore be employed with particular advantage for the manufacture of compression molding compositions and for encasing and potting in the electrical field, where resins of higher chlorine content show poorer stability, particularly in the simultaneous presence of heat and moisture.

It is a further task of the invention to provide an improved process by which glycidyl ethers of polyhydric phenols can be obtained in a very pure form by reaction of the phenolic hydroxyl groups with excess epichlorohydrin in the presence of alkali, with shortest possible cycle time.

It is furthermore possible, in this process, in every case to reemploy the distillate obtained after the condensation, after making up the consumed amount of epichlorohydrin and distillation losses, without rectifying the distillate and without an adverse effect on the condensation products.

The new process is further distinguished in that the yield almost corresponds to the glycidyl ether which should be produced theoretically. Furthermore, secondary epichlorohydrin losses through undesired side reactions, such as, for example, the polymerization of epichlorohydrin or formation of ether from epichlorohydrin in the presence of alkali, are reduced by the lower reaction temperature of 40° to 100° C., preferably 40°–65° C., which is employed, and by using an alcohol cosolvent.

The epoxidized novolac resins, made by the instant process exhibit higher than normal epoxy values. The epoxy cresol novolac (ECN) resins made by the instant process have epoxy values in the range of 0.48–0.52 equivalents/100 grams resin compared to the normal epoxy values for conventional ECN resins of 0.44–0.46 equivalents/100 grams resin. Likewise the epoxy phenol novolac (EPN) resins made by the instant process have epoxy values in the range of 0.60–0.64 equivalents/100 grams resin compared to the normal epoxy values for conventional EPN resins of 0.55–0.57 equivalents/100 grams resin.

The polyhydric phenols useful in the instant invention are the novolac resins obtained by the acid-catalyzed condensation of monophenols such as phenol, o-cresol, m-cresol p-cresol and other alkylated phenols, with aldehydes such as formaldehyde, acetaldehyde, crotonaldehyde, isobutyraldehyde and the like. The preferred novolac resins are the cresol novolacs prepared from o-cresol, m-cresol or p-cresol with formaldehyde, or phenol novolacs prepared from phenol with formaldehyde.

Alkali metal hydroxides in the sense of the invention are also to be understood as alkali metal hydroxides which contain up to 5% by weight of alkali metal carbonate or mixtures of alkali metal hydroxide and alkali metal carbonate, wherein the alkali metal carbonate content should be at most 5% by weight.

Alkali metal hydroxides which can be used are the solid compounds in the form of granules, flakes or powders. The hydroxides can be added portionwise or continuously by means of known devices, such as metering screws or bucket wheel locks.

The preferred alkali metal hydroxides are sodium hydroxide or potassium hydroxide, most particularly sodium hydroxide.

The particle size of the alkali metal hydroxide is also critical to the practical operation of the instant process. While the solid alkali metal hydroxide may be used in any shape or form, i.e. granules, pellets, flakes or powders, the actual size of the particles has a great influence on the rate of reaction and on the practicality of the process. Solid alkali metal hydroxide in powder form causes severe practical handling problems while conventional pellets (about 5 mm in diameter) do not dissolve quickly enough in the reaction mixture to allow the reaction to proceed at the desired rate.

Solid sodium or potassium hydroxide in the form of small beads of about 1 mm diameter exhibits a good balance of ease of handling coupled with rapid dissolution in the reaction mixture to yield an acceptable reaction rate for the instant process.

It is important that 0.5 to 8 percent by weight of water and 2 to 25 percent by weight of an alcohol cosolvent, both based on the reaction mixture, be present at the beginning and during the reaction. The elimination of hydrogen chloride is carried out by reaction with 0.90 to 1.15 equivalents of a solid alkali metal hydroxide per equivalent of phenolic hydroxyl groups which is added in portions or continuously at 40°–100° C., preferably 40°–65° C., in 30 to 300 minutes. If a high boiling alcohol cosolvent, such as methyl cellosolve, is used, an azeotropic dehydration is employed to ensure that the water content in the system does not exceed the 8% level.

The reaction is carried out with an excess of epichlorohydrin for each phenolic hydroxyl group present in the novolac. The weight ratio of epichlorohydrin to novolac used in the instant process can be as low as 3:1.

The reaction is carried out in the presence of 2 to 25 percent by weight, based on the reaction mixture, of a lower alkanol or lower alkoxyalkanol cosolvent, such as isopropanol, 2-methoxyethanol (methyl cellosolve), n-butanol, isobutanol or secondary butyl alcohol. Particularly useful as cosolvent is isopropanol or 2-methoxyethanol (methyl cellosolve). The alcohol serves three important functions. In the early stages of the reaction it solubilizes the sodium salt of the novolac, thus accelerating formation of the chlorohydrin intermediate. As the water content of the reaction mixture builds up the alcohol prevents formation of a separate water phase which would lead to excessive epichlorohydrin hydrolysis. Finally, it facilitates salt removal either by dissolution in water or by settling and decantation.

Once the novolac is dissolved in the excess epichlorohydrin, the weight ratio of excess epichlorohydrin to novolac being as low as 3:1, in the presence of 0.5 to 8% by weight of water, based on the total reaction mixture, and in the absence of any catalyst specific for the formation of the chlorohydrin intermediate, two separate paths can then be followed to prepare and isolate the desired epoxy novolac resin and to recover the excess epichlorohydrin and alcohol cosolvent.

In the first embodiment, approximately 1 part of cosolvent, such as a lower alkanol like isopropanol, is used for each part of novolac resin in the reaction mixture. The solid alkali metal hydroxide beads are added through a gradually escalating addition program at 40°–100° C., preferably 40°–65° C., over a three-hour period. To separate the alkali metal chloride salt formed during the reaction from the desired product, sufficient water is added to the reaction mixture to dissolve the precipitated salt. This leads to the formation of two liquid phases. The presence of the cosolvent aids in the dehydrochlorination and in the physical separation of the organic and aqueous layers thereby facilitating the removal of the chloride salt from the product in the organic layer. The product is then isolated in the usual manner.

In an alternate embodiment, a lesser amount of cosolvent, such as 2-methoxyethanol (methyl cellosolve), is used in the reaction mixture along with the excess epichlorohydrin. The addition of the solid alkali metal hydroxide beads, which is achieved through a gradually escalating addition program, is interrupted after the addition of 60–90% of the caustic, preferably 70–80%. At this point the water content in the batch is reduced to 0.5–4%, preferably 1–2%, by weight by azeotropic distillation under vacuum. Thereafter, the remaining caustic charge is added at 40°–100° C., preferably at 40°–50° C. The alkali metal chloride salt formed during the reaction precipitates in the organic product layer. The salt is allowed to settle and the upper organic layer containing the product is largely separated by decantation. The lower salt layer containing some product dissolved in epichlorohydrin is then thoroughly extracted with portions of fresh or recovered epichlorohydrin. The extracts are combined with the separated organic product layer and the product is isolated in the usual manner.

In both embodiments the reaction product can be taken up in a suitable solvent, such as acetone, methyl isobutyl ketone, benzene, toluene or xylene, and the alkali metal chloride salt can be washed out or removed by filtration till a clean resin solution is obtained. While the resin is in solution, an addition dehydrochlorination can be carried out to reduce still further the hydrolyzable chlorine level in the resin. The final resin can be isolated in the usual manner.

The following examples are presented for the purpose of illustration only and are not to be construed to limit the nature or scope of the instant invention in any manner whatsoever.

EXAMPLE 1

In a 5-liter, 4-necked creased flask fitted with an agitator, reflux condenser and screw feeder addition funnel, 650 grams of cresol novolac with a viscosity of approximately 800 cP (mPa s) at 150° C., is dissolved in 1950 grams of epichlorohydrin. To this mixture is added 650 grams of isopropanol and 26 grams of water. The solution is then heated to 60° C. The solution is then maintained at a temperature of 60°–62° C. with good agitation while 180 grams of solid sodium hydroxide in the form of 1 mm beads is added over a period of 2.5 hours in portions at 10–15 minute intervals with the size of the portions increasing from an initial 5 grams to 12 grams. Sodium chloride salt formation is observed after the third or fourth portion is added. Following the completion of this caustic addition, the mixture is stirred as a slurry for 30 minutes at 60° C. and is then cooled to 45° C.

An additional 45 grams of solid sodium hydroxide in the form of 1 mm beads is now added to the slurry over a 40–45 minute period in six portions. The mixture is then stirred for 30 minutes at 45° C. before 1130 ml of water is added at 40° C. to dissolve completely the precipitated sodium chloride salt present in the mixture.

The two-phase liquid system is allowed to separate and the upper organic layer is transferred to a stripping apparatus. The excess epichlorohydrin and isopropanol solvents are removed by distillation first at 50° C./200 mm Hg with a gradually increasing temperature and vacuum to 160° C./25 mm Hg, controlling the vacuum so that the resin solution remains stirrable. The resin is held at 160° C./25 mm Hg for two hours to complete the stripping. The product is then discharged as a melt for subsequent flaking.

The epoxidized cresol novolac (ECN) resin prepared as such has an epoxy value of 0.498 equivalents/100 grams resin and contains 0.60% hydrolyzable chlorine.

The distillate obtained during isolation of the ECN resin contains epichlorohydrin, isopropanol and a minor amount of water. This mixture can be reused in the process several times without further rectification and without adversely affecting the quality of the ECN resin prepared in subsequent batches.

EXAMPLE 2

In a 5-liter, 4-necked creased flask fitted with an agitator, reflux condenser and screw feeder addition funnel, 1000 grams of cresol novolac with a viscosity of approximately 800 cP (mPa s) at 150° C., is dissolved in 3500 grams of epichlorohydrin. To this solution is added 210 grams of 2-methoxyethanol (methyl cellosolve) and 52 grams of water. The solution is then heated to 60° C. The solution is then maintained at a temperature of 60°-62° C. with good agitation while 283 grams of solid sodium hydroxide in the form of 1 mm beads is added over a period of 2.5 hours in portions at 10-15 minute intervals and with the size of the portions increasing from an initial 10 grams to 25 grams. Sodium chloride salt formation is observed after the third or fourth portion has been added. Following the completion of this caustic addition, the mixture is stirred for 20 minutes at 60° C. and is then cooled to 50° C. A vacuum of 100 mm Hg is imposed on the flask to remove azeotropically about 100 ml of water with the removed epichlorohydrin being returned to the reaction mixture.

An additional 71 grams of solid sodium hydroxide in the form of 1 mm beads is now added to the reaction mixture at a temperature of 45° C. over a 60 minute period in 12 gram portions. The mixture is then slurried for 20 minutes at 45°-50° C. and another 70 ml of water is distilled off azeotropically under 100 mm Hg vacuum.

Agitation is then stopped and the reaction mixture is allowed to settle for at least 15 minutes to permit phase separate to occur. The upper organic layer containing the product is decanted into a second flask while the lower layer containing the separated salt is extracted three times with 1000 gram portions of epichlorohydrin. These epichlorohydrin extracts are combined with the earlier separated product layer. The combined solution is then distilled under a vacuum of 50 mm Hg to remove the 2-methoxyethanol and epichlorohydrin solvents with the temperature gradually raised to 160° C. The resin in the flask is held at 160° C./25 mm Hg for two hours to complete the stripping. The product is then discharged as a melt for subsequent flaking.

The epoxidized cresol novolac (ECN) resin prepared as such has an epoxy value of 0.50 equivalents/100 grams resin and contains 0.12% hydrolyzable chlorine.

EXAMPLE 3

In a 1-liter, 4-necked creased flask fitted with an agitator, reflux condenser and screw feeder addition funnel, 189 grams of phenol novolac having a viscosity of 7900 cP (mPa s) at 100° C. is dissolved in 646 grams of epichlorohyrin. To this solution is added 25 grams of 2-methoxyethanol (methyl cellosolve) and 5 grams of water. The solution is then heated to 60° C. The solution in then maintained at a temperature of 60°-64° C. with good agitation while 54 grams of solid sodium hydroxide in the form of 1 mm beads is added over a period of 2.5 hours in 24 portions, gradually decreasing the time interval between portions from an initial 10 minutes to 3 minutes. Sodium chloride salt formation is observed after the fourth or fifth addition of caustic. Following the completion of this caustic addition, the mixture is stirred for 10 minutes at 60° C. A vacuum of 50 mm Hg is very gradually applied to the flask to remove azeotropically about 18 ml of water with the removed epichlorohydrin being returned to the reaction mixture.

An additional 22 grams of solid sodium hydroxide in the form of 1 mm beads is now added to the reaction mixture at a temperature of 45° C. over a 50 minute period in 2 gram portions. The mixture is then stirred for 20 minutes at 45°-50° C. and the additional water is distilled off azeotropically under 50 mm Hg vacuum to 43° C.

Agitation is then stopped and the reaction mixture is allowed to settle for at least 15 minutes to permit phase separation to occur. The upper organic layer containing the product is decanted into a second flask while the lower layer containing the separated salt is extracted three times with 150 gram portions of epichlorohydrin. These epichlorohydrin extracts are combined with earlier separated product layer. The combined solution is then distilled under vacuum at 100 mm Hg to remove the 2-methoxyethanol and epichlorohydrin solvents with the temperature gradually raised to 165° C. The residue in the flask is then dissolved in 160 g of toluene and filtered in a pressure filter at about 90° C. The solvent is then removed under vacuum at 80 mm Hg, gradually increasing the temperature to 155° C. Under vacuum 50 ml of water is added dropwise to flash off the last traces of volatiles. Then the product is discharged.

The epoxidized phenol novolac (EPN) prepared has an epoxy value of 0.63 equivalents/100 grams of resin and contains 0.02% hydrolyzable chlorine.

What is claimed is:

1. An improved process for the production of an epoxy novolac resin, having a higher than normal epoxy value, wherein a novolac is reacted at a temperature of 40°-100° C., in the absence of any catalyst specific for the formation of the chlorohydrin ether intermediate, in the presence of 2 to 25% by weight, based on the reaction mixture, of a lower alkanol or lower alkoxyalkanol cosolvent, with excess epichlorohydrin, based on the phenolic hydroxyl value, in the presence of 0.5 to 8% by weight of water, based on the reaction mixture, and with 0.9 to 1.15 equivalents of solid alkali metal hydroxide per phenolic hydroxyl group, to give the epoxy novolac, wherein the improvement comprises having 0.5 to 8% by weight of water in the reaction mixture throughout the reaction period, using a solid alkali metal hydroxide in the form of beads of about 1 mm diameter, which hydroxide is charged to the reaction mixture portionwise or continuously during a gradually escalating addition program, and isolating the epoxy novolac resin.

2. A process according to claim 1 wherein the epoxy novolac is an epoxy cresol novolac (ECN) resin having an epoxy value of 0.48-0.52 equivalents/100 grams resin.

3. A process according to claim 1 wherein the epoxy novolac is an epoxy phenol novolac (EPN) resin having an epoxy value of 0.60-0.64 equivalents/100 grams resin.

4. A process according to claim 1 wherein the alkali metal hydroxide is sodium hydroxide.

5. A process according to claim 1 wherein the reaction temperature is 40°-65° C.

6. A process according to claim 1 wherein the cosolvent is isopropanol.

7. A process according to claim 1 wherein the cosolvent is 2-methoxyethanol (methyl cellosolve).

8. A process according to claim 1 wherein isolating the resin involves removing by-product salt by dissolving in water followed by phase separation.

9. A process according to claim 1 wherein isolating the resin involves removing by-product salt by decanting the resin solution from settled solid salt.

* * * * *